United States Patent
Kubotani

(10) Patent No.: US 11,618,445 B2
(45) Date of Patent: Apr. 4, 2023

(54) INDUSTRIAL VEHICLE WITH REGENERATIVE BRAKING LIMIT CONTROL

(71) Applicant: KABUSHIKI KAISHA TOYOTA JIDOSHOKKI, Kariya (JP)

(72) Inventor: Takehiro Kubotani, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 70 days.

(21) Appl. No.: 16/989,077

(22) Filed: Aug. 10, 2020

(65) Prior Publication Data

US 2021/0046931 A1 Feb. 18, 2021

(30) Foreign Application Priority Data

Aug. 13, 2019 (JP) .............................. JP2019-148570

(51) Int. Cl.
*B60W 30/18* (2012.01)
*B60W 30/14* (2006.01)
*B60W 40/08* (2012.01)

(52) U.S. Cl.
CPC .... *B60W 30/143* (2013.01); *B60W 30/18127* (2013.01); *B60W 40/08* (2013.01); *B60W 2300/12* (2013.01); *B60W 2520/10* (2013.01); *B60W 2540/10* (2013.01)

(58) Field of Classification Search
CPC ......... B60W 30/143; B60W 30/18127; B60W 40/08; B60W 2300/12; B60W 2520/10; B60W 2540/10; B60W 30/18; B60W 30/182; B60W 40/00; B60W 40/105; B60L 7/14; B60L 2200/44; B60L 2240/12;
(Continued)

(56) References Cited

U.S. PATENT DOCUMENTS

| | | | |
|---|---|---|---|
| 2014/0005869 A1* | 1/2014 | Kubotani | ................ B60L 15/20 701/22 |
| 2015/0019057 A1 | 1/2015 | Morisaki et al. | |
| 2015/0039164 A1* | 2/2015 | Onodera | ............. B60L 15/2072 701/22 |

FOREIGN PATENT DOCUMENTS

| | | | | |
|---|---|---|---|---|
| GB | 2357200 A | * | 6/2001 | .......... B66F 9/07509 |
| GB | 2357200 A | | 6/2001 | |
| JP | 06-098421 A | | 4/1994 | |

(Continued)

*Primary Examiner* — Donald J Wallace
*Assistant Examiner* — Daniel M. Robert
(74) *Attorney, Agent, or Firm* — Sughrue Mion, PLLC

(57) ABSTRACT

An industrial vehicle including: a direction calculation unit that calculates an instructed travel direction of the vehicle based on an operation position of the direction instruction member; a vehicle speed calculation unit that calculates an actual speed of the vehicle; a switching unit that switches between permission and prohibition of regenerative braking limit; and a control unit that controls traveling of the vehicle. The control unit is configured to be switchable between a regenerative braking limit state where the regenerative braking limit is performed and a regenerative braking limit release state where the regenerative braking limit is released, when the vehicle speed limit mode is activated and the regenerative braking limit is permitted. The control unit has at least one control pattern that switches between the regenerative braking limit state and the regenerative braking limit release state when a predetermined condition is satisfied.

4 Claims, 11 Drawing Sheets

(58) Field of Classification Search
CPC ........ B60L 2240/32; B60L 15/20; B60T 1/10; Y02P 90/60; Y02T 10/64; Y02T 10/72
See application file for complete search history.

(56) References Cited

FOREIGN PATENT DOCUMENTS

| | | | | |
|---|---|---|---|---|
| JP | 11-215604 A | | 8/1999 | |
| JP | 2001-139296 A | | 5/2001 | |
| JP | 2004-215465 A | | 7/2004 | |
| JP | 2004215447 A | * | 7/2004 | .......... B60L 15/2018 |
| JP | 3596748 B2 | * | 12/2004 | |
| JP | 2011215604 A | * | 10/2011 | ........... G03G 15/161 |
| JP | 2011-239605 A | | 11/2011 | |
| JP | 2014-11882 A | | 1/2014 | |
| JP | 2015-19521 A | | 1/2015 | |
| JP | 2016-130105 A | | 7/2016 | |

* cited by examiner

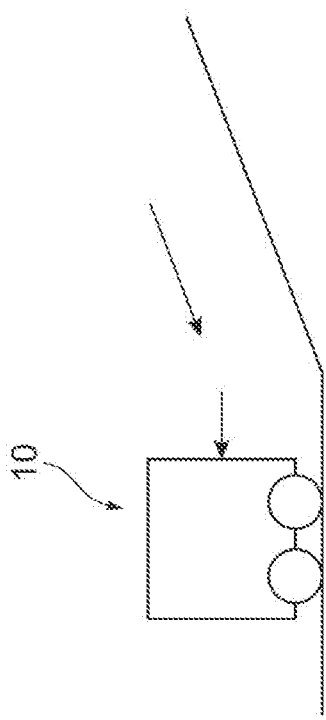
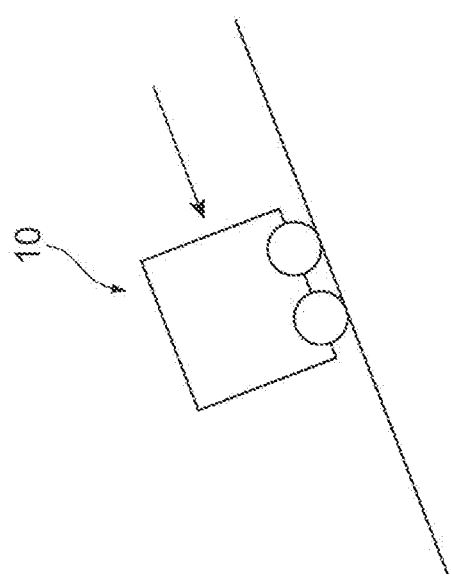

INDUSTRIAL VEHICLE WITH REGENERATIVE BRAKING LIMIT CONTROL

CROSS REFERENCE TO RELATED APPLICATIONS

This application claims priority to Japanese Patent Application No. 2019-148570 filed on Aug. 13, 2019, the entire contents of which are incorporated by reference herein.

TECHNICAL FIELD

The present invention relates to an industrial vehicle.

BACKGROUND

In the related art, there is known an industrial vehicle, for example, as disclosed in Japanese Unexamined Patent Publication No. 2014-11882. The industrial vehicle disclosed in Japanese Unexamined Patent Publication No. 2014-11882 has a normal travel mode where the vehicle is controlled to travel at a vehicle speed corresponding to a target speed and a vehicle speed limit mode where a vehicle speed limit value smaller than a maximum vehicle speed value is determined and the vehicle is controlled to travel at a vehicle speed smaller than the vehicle speed limit value, as travel control modes. The industrial vehicle switches between the normal travel mode and the vehicle speed limit mode according to a change mode of the target speed induced by an accelerator operation performed by a driver and a change mode of an instructed travel direction induced by the operation of a direction instruction member.

In the above-described industrial vehicle, when the driver performs an operation to command acceleration or deceleration or stopping, it is required that the discomfort felt due to a difference between an assumed movement and an actual movement is reduced to further improve the sensory performance. Therefore, an object of the present invention is to provide an industrial vehicle in which the sensory performance of an operation can be improved.

SUMMARY

According to an aspect of the present invention, there is provided an industrial vehicle that has a normal travel mode where the vehicle is controlled to travel at a vehicle speed corresponding to a target speed and a vehicle speed limit mode where a vehicle speed limit value smaller than a maximum vehicle speed value is determined and the vehicle is controlled to travel at a vehicle speed smaller than the vehicle speed limit value, as travel control modes, the vehicle including: an accelerator operation member that instructs the vehicle to accelerate according to an operation performed by a driver; a target speed calculation unit that calculates the target speed of the vehicle based on an operation amount of the accelerator operation member; a direction instruction member that instructs the vehicle on a travel direction according to an operation performed by the driver; a direction calculation unit that calculates an instructed travel direction of the vehicle based on an operation position of the direction instruction member; a vehicle speed calculation unit that calculates an actual speed of the vehicle; a switching unit that switches between permission and prohibition of regenerative braking limit; and a control unit that controls traveling of the vehicle. The control unit is configured to be switchable between a regenerative braking limit state where the regenerative braking limit is performed and a regenerative braking limit release state where the regenerative braking limit is released, when the vehicle speed limit mode is activated and the regenerative braking limit is permitted. The control unit has at least one control pattern that switches between the regenerative braking limit state and the regenerative braking limit release state when a predetermined condition is satisfied.

According to the present invention, there is provided the industrial vehicle in which the sensory performance of an operation can be improved.

BRIEF DESCRIPTION OF THE DRAWINGS

FIG. 11A and FIG. 11B are schematic views illustrating traveling states of the forklift.

DETAILED DESCRIPTION

Figure 1:
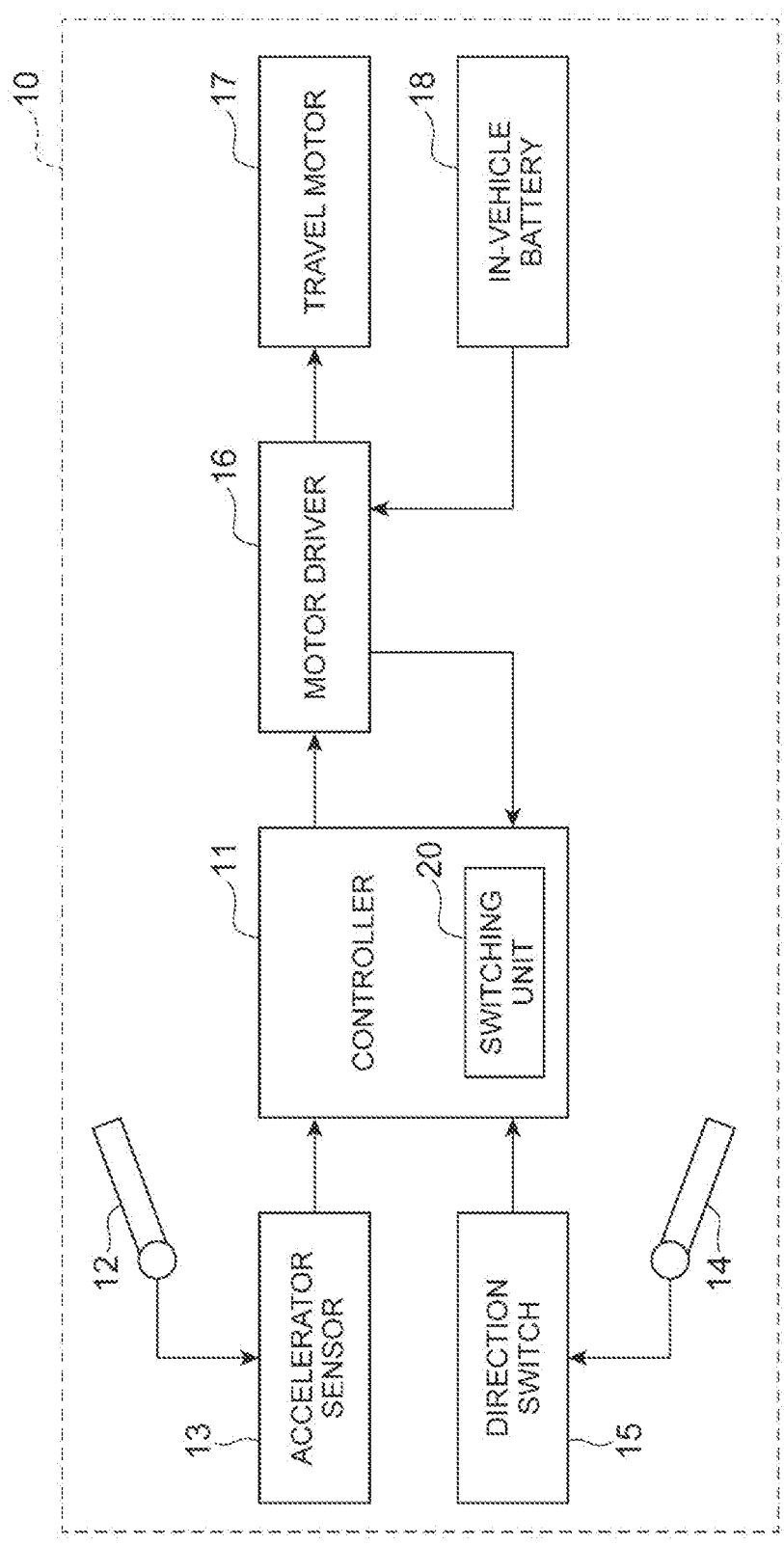
FIG. 1 is a schematic diagram illustrating a block configuration of a forklift that is an industrial vehicle according to an embodiment of the present invention.

Hereinafter, an embodiment of the present disclosure will be described in detail with reference to the drawings. Incidentally, in the drawings, the same reference signs are assigned to the same or equivalent elements and duplicated descriptions will be omitted.

As illustrated in FIG. 1, a forklift 10 as an industrial vehicle includes a controller 11, an accelerator pedal 12, an accelerator sensor 13, a direction lever 14, a direction switch 15, a motor driver 16, a travel motor 17, an in-vehicle battery 18, and a switching unit 20.

The controller 11 is a control unit that controls the entirety of the forklift 10, and is configured to include a processor, a memory, and a storage. The processor is a calculator such as a central processing unit (CPU). The memory is a storage medium such as read only memory (ROM) or a random access memory (RAM). The storage is a storage medium such as a hard disk drive (HDD). The processor collectively controls the memory, the storage, a communication interface, and a user interface to realize the function of the controller 11 which will be described later. In the controller 11, for example, a program stored in the ROM is loaded onto the RAM and the CPU executes the program loaded in the RAM to realize various functions.

The controller 11 is connected to the accelerator sensor 13 that is installed in the vehicle to detect the operation amount (acceleration opening degree) of the accelerator pedal 12 as an accelerator operation member that instructs the vehicle to accelerate according to an operation performed by a driver. The accelerator sensor 13 transmits an electric signal, which corresponds to the operation amount of the accelerator pedal 12, to the controller 11. Then, the controller 11 as a target speed calculation unit calculates the target speed of the vehicle based on the operation amount of the accelerator pedal 12. In addition, the controller 11 is connected to the direction switch 15 that is installed in the vehicle to detect the operation position of the direction lever 14 as a direction instruction member that instructs the vehicle on the travel direction according to an operation performed by the driver. The direction switch 15 transmits an electric signal, which corresponds to the operation position of the direction lever 14, to the controller 11. Then, the controller 11 serving as a direction calculation unit calculates the instructed travel direction of the vehicle based on the operation position of the direction lever 14.

The controller 11 includes the switching unit 20. The switching unit 20 is a program stored in the storage medium such as the memory or the storage, and switches between permission and prohibition of regenerative braking limit based on the signal from the accelerator sensor 13 or the direction switch 15 connected to the controller 11. When the regenerative braking limit is permitted, regenerative braking is limited except when there is need to release the regenerative braking limit. When the regenerative braking limit is prohibited, regenerative braking is executed without being limited. Incidentally, details of the regenerative braking limit will be described later.

In addition, the travel motor 17 that supplies a traveling force to the vehicle is connected to the controller 11 via the motor driver 16. Electric power is supplied from the in-vehicle battery 18 to the travel motor 17 via the motor driver 16. The forklift 10 of the present embodiment is a battery type (electric type) that travels using power from the travel motor 17.

Various electric signals such as an acceleration or deceleration command and a rotation speed command are transmitted from the controller 11 to the motor driver 16. Then, the motor driver 16 receives the electric signals, which are transmitted from the controller 11, to drive the travel motor 17. Meanwhile, various electric signals such as actual rotation of the travel motor 17 are transmitted from the motor driver 16 to the controller 11. Then, the controller 11 as a vehicle speed calculation unit converts the actual rotation, which is transmitted from the motor driver 16, to the actual speed of the vehicle. In addition, the controller 11 calculates an actual travel direction where the vehicle actually travels, based on the actual rotation.

Figure 2:
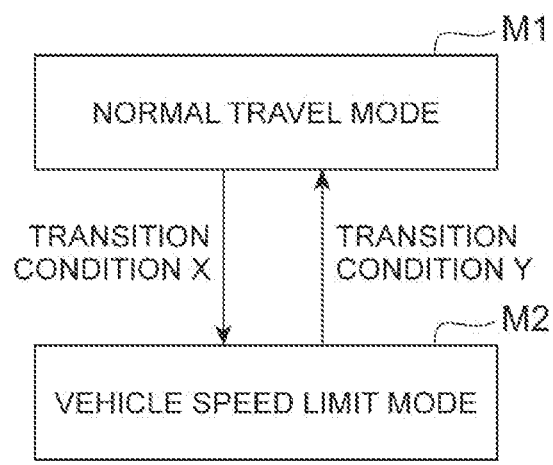
FIG. 2 is a schematic diagram illustrating a travel control mode.

The controller 11 serving as a control unit in the present embodiment selects a travel control mode illustrated in FIG. 2 according to the traveling state of the vehicle, to control the traveling of the vehicle according to control content of the mode. The travel control mode includes a normal travel mode M1 and a vehicle speed limit mode M2. Then, when a transition condition X is satisfied during staying in the normal travel mode M1, the controller 11 causes the travel control mode to make a transition to the vehicle speed limit mode M2. Meanwhile, when a transition condition Y is satisfied during staying in the vehicle speed limit mode M2, the controller 11 causes the travel control mode to make a transition to the normal travel mode M1. The normal travel mode M1 is a mode where the vehicle travels at a speed corresponding to the acceleration opening degree according to an accelerator operation performed by the driver. Namely, the normal travel mode M1 is a mode where the vehicle is controlled to travel at a speed corresponding to the target speed. In the normal travel mode M1, a motoring operation and a regenerative operation (operation of performing regenerative braking) of the travel motor 17 are permitted. Meanwhile, the vehicle speed limit mode M2 is a mode where the vehicle receives an external force to be able to travel even though the driver does not operate the accelerator. For example, the external force received by the vehicle includes gravity on a slope and the like. In the vehicle speed limit mode M2, a vehicle speed limit value is determined and the traveling is controlled such that the vehicle speed is lower than the vehicle speed limit value. The vehicle speed limit value is a value smaller than a maximum vehicle speed value of the vehicle, and is set to, for example, 2 to 4 km/h. Then, in the vehicle speed limit mode M2, the regenerative operation of the travel motor 17 is permitted, and the vehicle speed is controlled to be lower than the vehicle speed limit value by utilizing the regenerative operation of the travel motor 17.

Figure 3:
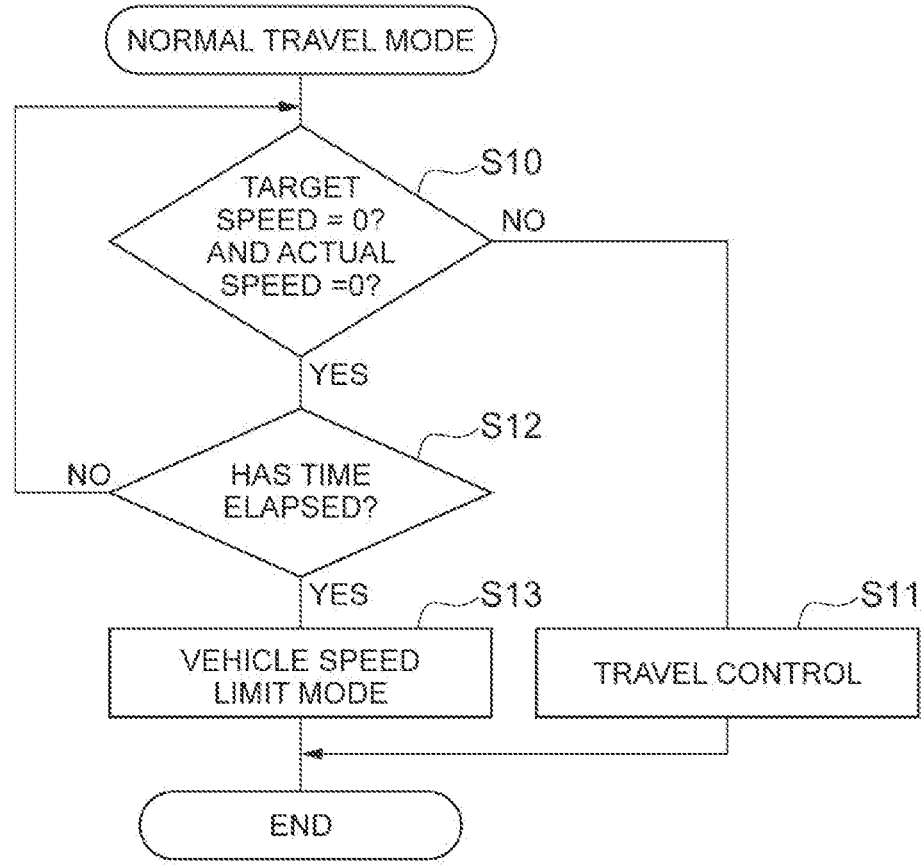
FIG. 3 is a flowchart illustrating control content in a normal travel mode.

First, control content of the controller 11 in each travel control mode will be described with reference to FIGS. 3 and 4. As illustrated in FIG. 3, in the normal travel mode M1, the controller 11 determines whether or not the target speed is "zero" and the actual speed is "zero" (Step S10). In Step S10, it is determined whether or not the driver has an intention of stopping the vehicle and the vehicle is actually stopped. The case where the target speed is "zero" includes a case where the accelerator is not operated and a case where the accelerator is operated but the operation amount thereof is very small. The case where the operation amount is very small is a case where the acceleration opening degree is within a dead band region that is determined in advance.

When the determination result in Step S10 is NO (target speed>0 and actual speed>0), the controller 11 performs control such that the vehicle travels at the target speed set according to the acceleration opening degree (Step S11). Meanwhile, when the determination result in Step S10 is YES (target speed=0 and actual speed=0), the controller 11 determines whether or not the time after the target speed has become "zero" has passed a time that is determined in advance (Step S12). When the determination result is NO, the controller 11 returns to the process of Step S10. Meanwhile, when the determination result in Step S12 is YES, the controller 11 causes the travel control mode to make a transition to the vehicle speed limit mode M2. As described above, in the present embodiment, a combination of the condition that the determinations in Steps S10 and S12 are YES, namely, the condition that the target speed is "zero", the condition that the actual speed is "zero", and the condition that the predetermined time has elapsed from the above states is the transition condition X for transition from the normal travel mode M1 to the vehicle speed limit mode M2. According to such a mode transition, for example, when the accelerator is not performed during descending a slope, the vehicle is reliably stopped for the moment and then a transition to the vehicle speed limit mode M2 may be made and the descending the slop may be permitted.

Figure 4:
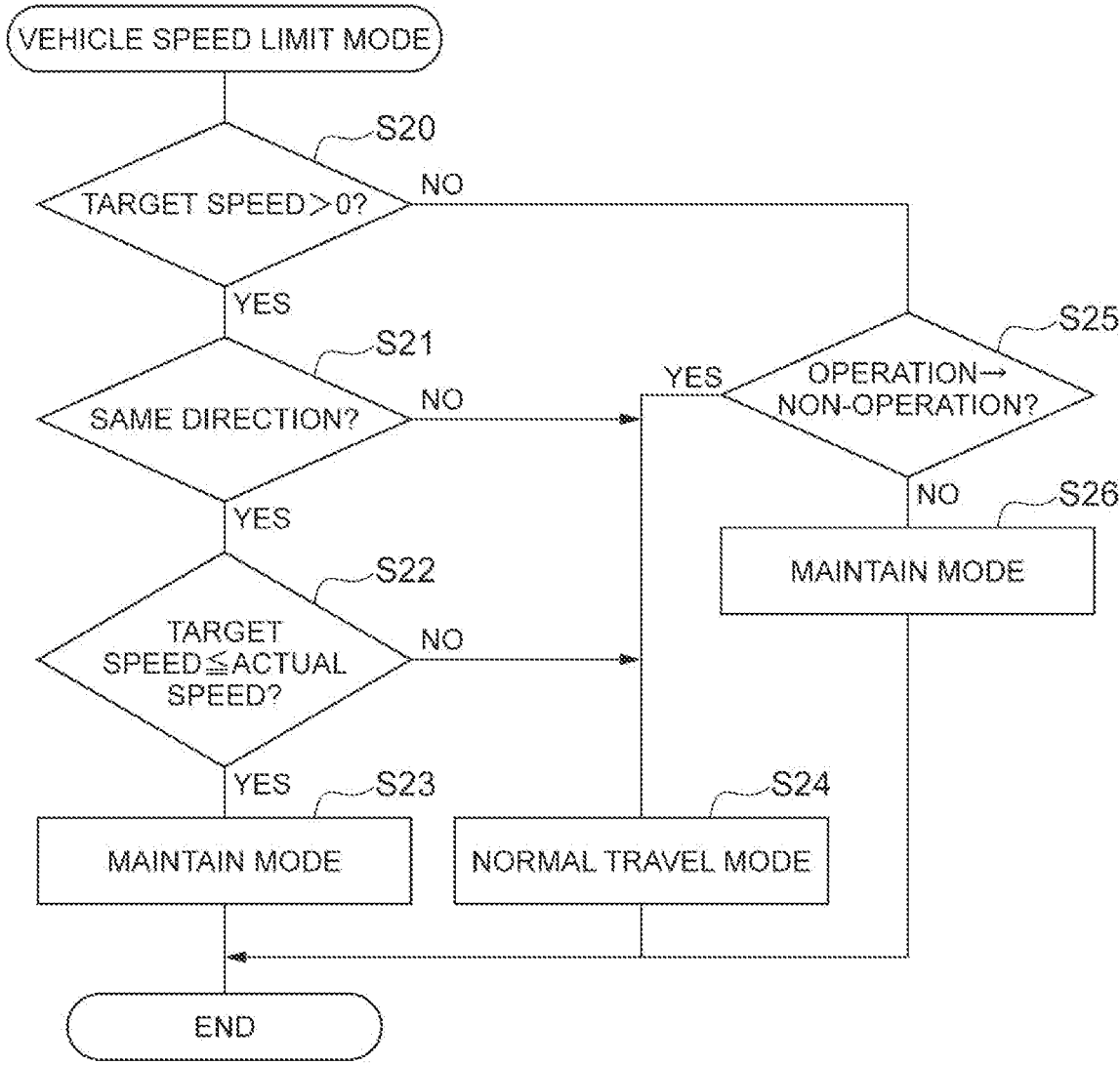
FIG. 4 is a flowchart illustrating control content in a vehicle speed limit mode.

As illustrated in FIG. 4, in the vehicle speed limit mode M2, the controller 11 determines whether or not the target speed is higher than "zero" (Step S20). In Step S20, in the vehicle speed limit mode M2, it is determined whether or not the driver operates the accelerator. Then, when the determination result in Step S20 is YES (target speed>0), the controller 11 determines whether or not the instructed travel direction of the vehicle coincides with an actual travel direction (Step S21). When the determination result is YES (coincidence of the directions), the controller 11 compares the target speed to the actual speed to determine whether or not the actual speed is the target speed or higher (Step S22). When the determination result is YES (target speed ≦ actual speed), the controller 11 maintains the vehicle speed limit mode M2 and continues the travel control in the vehicle speed limit mode M2 (Step S23). Meanwhile, when the determination result in Step S21 is NO (non-coincidence of the directions), the controller 11 stops the travel control in the vehicle speed limit mode M2 and causes the travel control mode to make a transition to the normal travel mode M1 (Step S24). In addition, when the determination result in Step S22 is NO (target speed>actual speed), the controller 11 stops the travel control in the vehicle speed limit mode M2 and causes the travel control mode to make a transition to the normal travel mode M1 (Step S24).

In the vehicle speed limit mode M2, as described above, the motoring operation is prohibited whereas the regenerative operation of the travel motor 17 is permitted. Namely, in the vehicle speed limit mode M2, a travel driving force is not output. Meanwhile, the controller 11 as a calculation unit calculates a target speed when the accelerator is operated during the vehicle speed limit mode M2, and calculates control information (acceleration calculation value and the like) required to reach the target speed. For this reason, when a transition to the normal travel mode M is made in Step S24, the controller 11 serving as a reset unit in the present embodiment resets the calculation result in the vehicle speed limit mode M2. Incidentally, the control information based on the calculation result in the vehicle speed limit mode M2 is transmitted to the motor driver 16, but the motor driver 16 does not drive the travel motor 17 according to the control information.

Referring back to a description of FIG. 4, when the determination result in Step S20 is NO (target speed=0), the controller 11 determines whether or not a transition is made from a state where the accelerator is operated to a state where the accelerator is not operated (Step S25). When the determination result is YES, the controller 11 stops the travel control in the vehicle speed limit mode M2 and causes the travel control mode to make a transition to the normal travel mode M1 (Step S24). Meanwhile, when the determination result in Step S25 is NO, the controller 11 maintains the vehicle speed limit mode M2 and continues the travel control in the vehicle speed limit mode M2 (Step S26).

As described above, in the present embodiment, the condition that the determination in Step S20 is YES and the determination in Step S21 is NO, namely, the condition that the target speed is higher than "zero" and the instructed travel direction does not coincide with the actual travel direction is the transition condition Y for transition from the vehicle speed limit mode M2 to the normal travel mode M1. In addition, in the present embodiment, the condition that the determinations in Steps S20 and 21 are YES and the determination in Step S22 is NO, namely, the condition that the target speed is higher than "zero", the instructed travel direction coincides with the actual travel direction, and the target speed is higher than the actual speed is the transition condition Y for transition from the vehicle speed limit mode M2 to the normal travel mode M1. In addition, in the present embodiment, the condition that the determination in Step S20 is NO and the determination in Step S25 is YES, namely, the condition that the target speed is "zero" and a transition is made from a state where the accelerator is operated to a state where the accelerator is not operated is the transition condition Y for transition from the vehicle speed limit mode M2 to the normal travel mode M1.

Meanwhile, in the present embodiment, the condition that the determinations in Steps S20, S21, and S22 are YES, namely, the condition that the target speed is higher than "zero", the instructed travel direction coincides with the actual travel direction, and the target speed is the actual speed or lower is a condition for maintaining the vehicle speed limit mode M2.

Next, the regenerative braking limit will be described in detail with reference to FIGS. 5 to 11. When the vehicle speed limit mode M2 is activated and the regenerative braking limit is permitted, the controller 11 is configured to be switchable between a regenerative braking limit state where the regenerative braking limit is performed and a regenerative braking limit release state where the regenerative braking limit is released. When the regenerative braking limit is permitted, in a case where a transition to the vehicle speed limit mode M2 is made, the controller 11 is basically set to the regenerative braking limit state. In the regenerative braking limit state, a regeneration limit value is set to a value lower than a value in the regenerative braking limit release state. The regeneration limit value is a value that determines an upper limit value beyond which an actual regeneration value (magnitude of a regenerative braking force that is actually generated) cannot be increased. There is no particular limitation on what value the regeneration limit value is set to in the regenerative braking limit state, and the regeneration limit value may be appropriately set depending on the capacity of the in-vehicle battery 18 or the like. For example, in the case of a system such as a fuel cell forklift that adopts a small-capacity capacitor, the regeneration limit value may be set to a required value where a rise in voltage of the capacitor can be prevented by the regenerative braking limit. Since regeneration is performed without limitation in the regenerative braking limit release state, the regeneration limit value is set to a value where the maximum regenerative braking performance is obtained.

For example, as illustrated in FIGS. 6 to 10, for the item "motor motoring and regeneration state", the regeneration limit value in the regenerative braking limit state is set to a "regenerative braking limit value", and the regeneration limit value in the regenerative braking limit release state is set to a "regenerative braking limit release value". Incidentally, in FIGS. 6 to 10, the item "regenerative braking limit permission" indicates whether the regenerative braking limit is permitted or prohibited. The item "direction" indicates whether the direction lever 14 that determines the instructed travel direction of the vehicle is in a forward, neutral, or reverse position. The item "accelerator" indicates the magnitude of the operation of the accelerator pedal 12, namely, the magnitude of the target speed. The item "actual speed" indicates an actual vehicle speed direction and the magnitude of the actual speed in the actual vehicle speed direction. The item "mode" indicates whether the travel control mode is set to the normal travel mode M1 or the vehicle speed limit mode M2.

Figure 6:
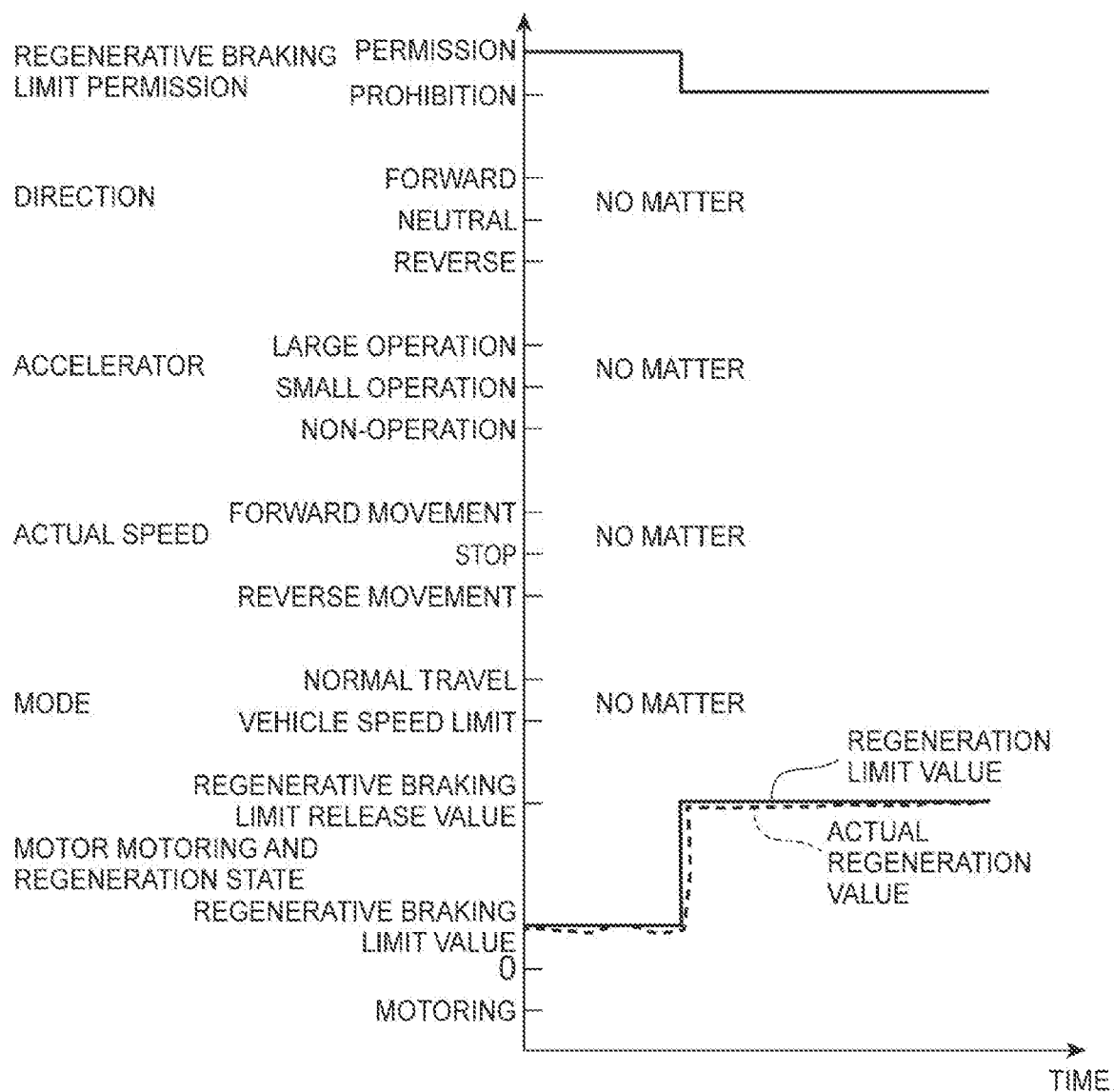
FIG. 6 is a chart illustrating one example of processing content of a first control pattern 1.
Figure 7:
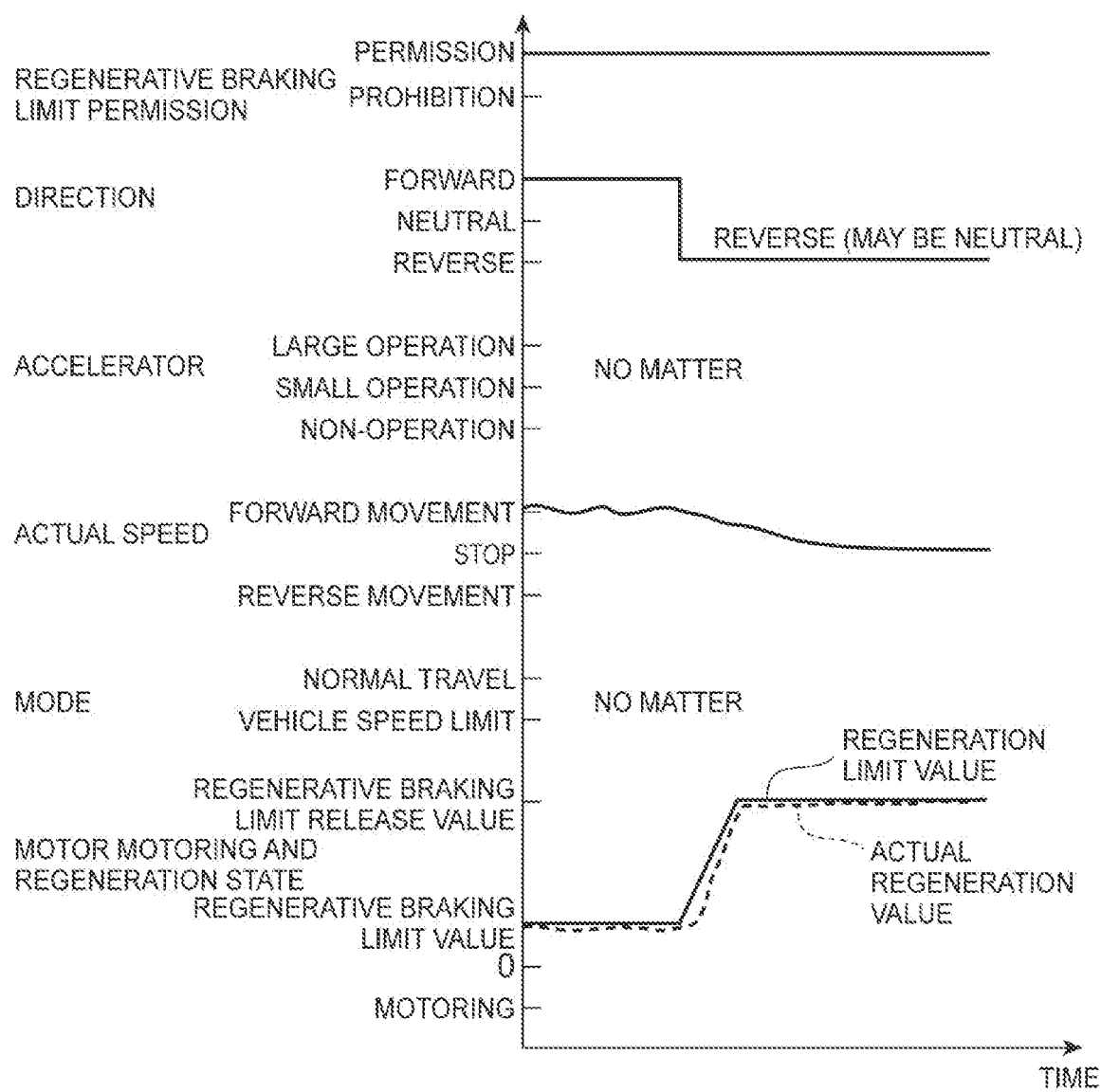
FIG. 7 is a chart illustrating one example of processing content of a control pattern 2.
Figure 8:
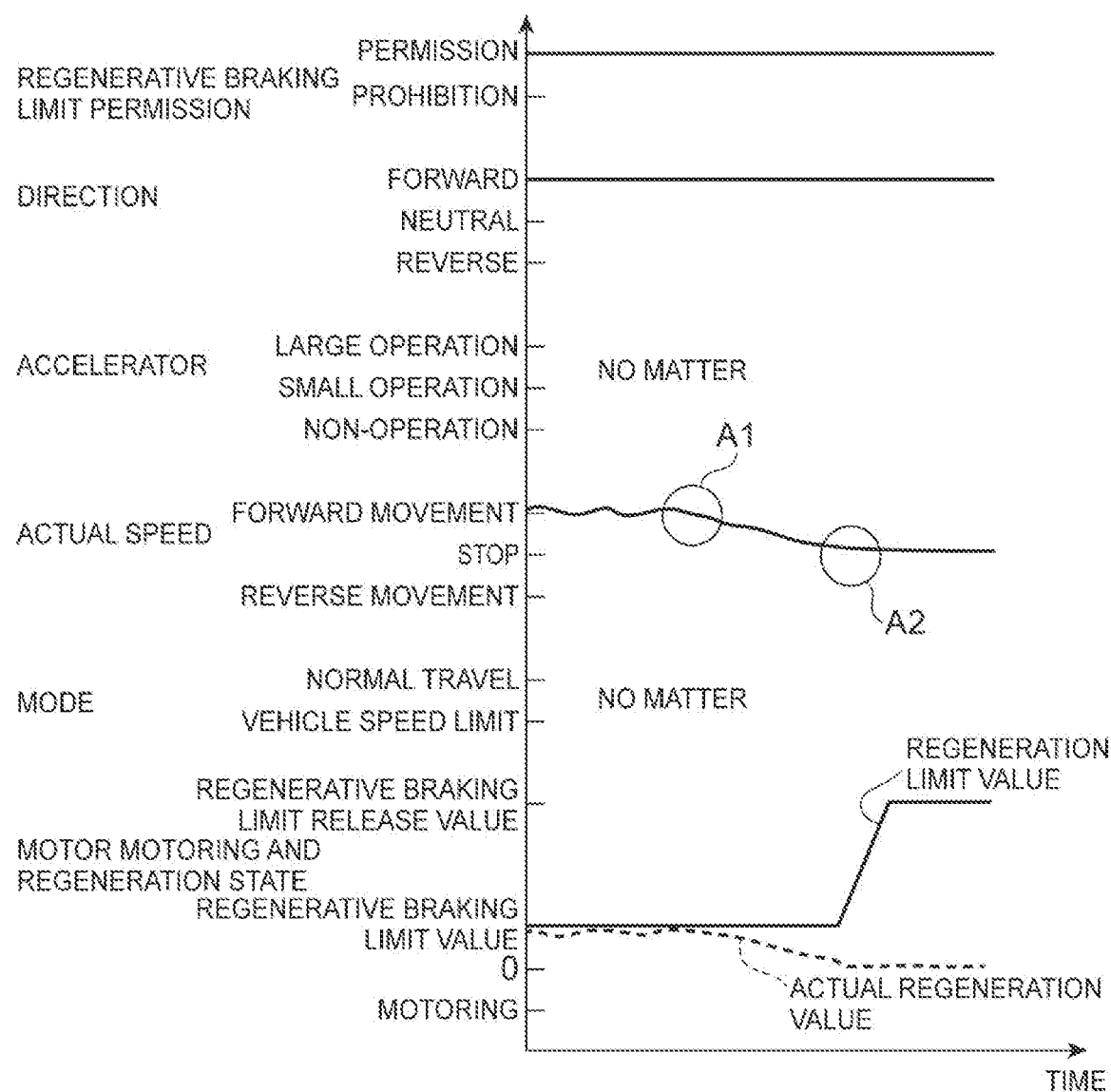
FIG. 8 is a chart illustrating one example of processing content of the control pattern 2.
Figure 9:
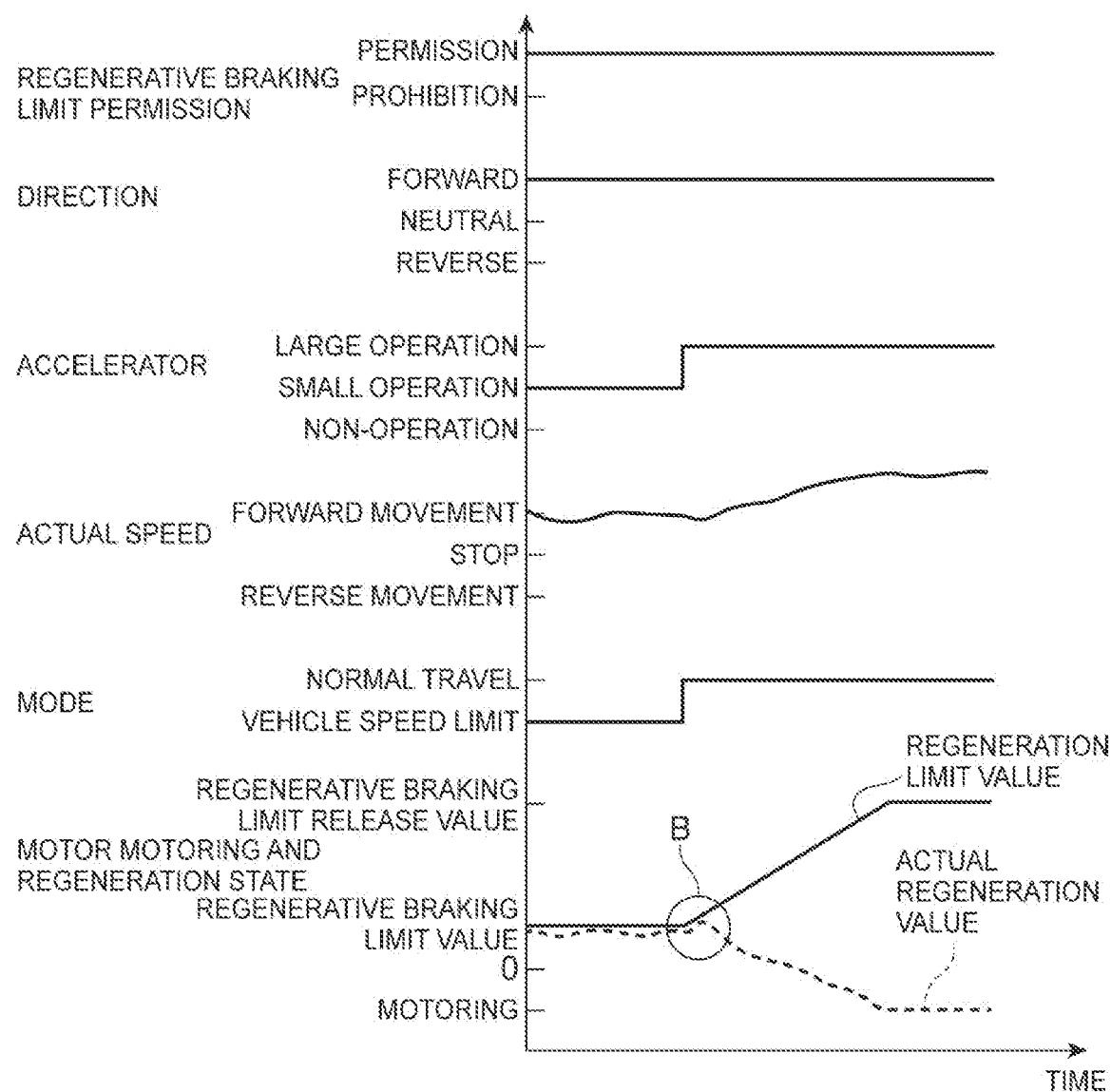
FIG. 9 is a chart illustrating one example of processing content of a control pattern 3.
Figure 10:
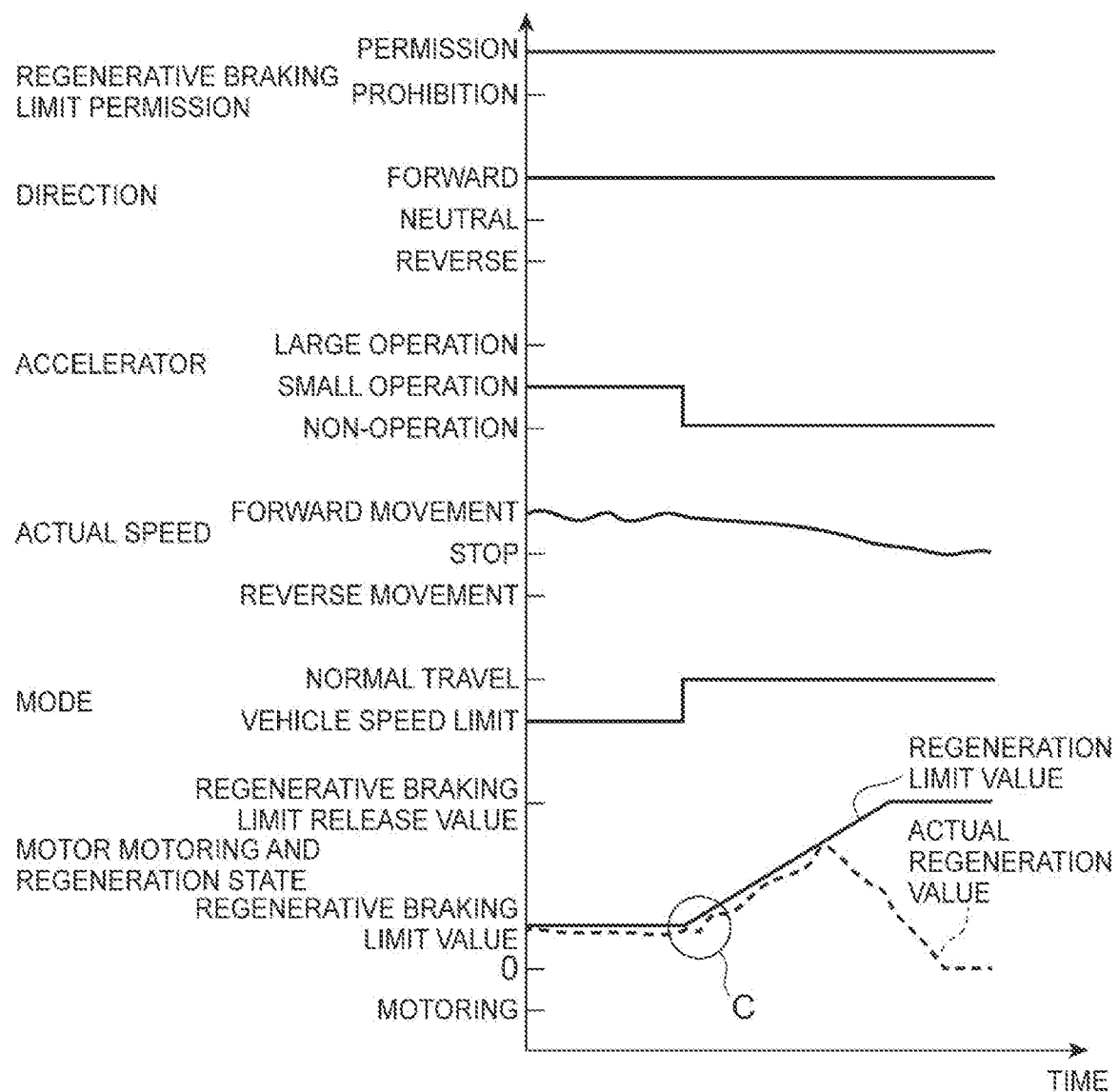
FIG. 10 is a chart illustrating one example of processing content of the control pattern 3.

In addition, the controller 11 has at least one control pattern that switches between the regenerative braking limit state and the regenerative braking limit release state when the predetermined condition is satisfied. In the present embodiment, the controller 11 performs switching between three control patterns 1 to 3. In addition, the controller 11 has a control pattern 4 where the regenerative braking limit state is maintained. The content of the control pattern 1 is illustrated in FIG. 6, the content of the control pattern 2 is illustrated in FIGS. 7 and 8, and the content of the control pattern 3 is illustrated in FIGS. 9 and 10.

Figure 5:
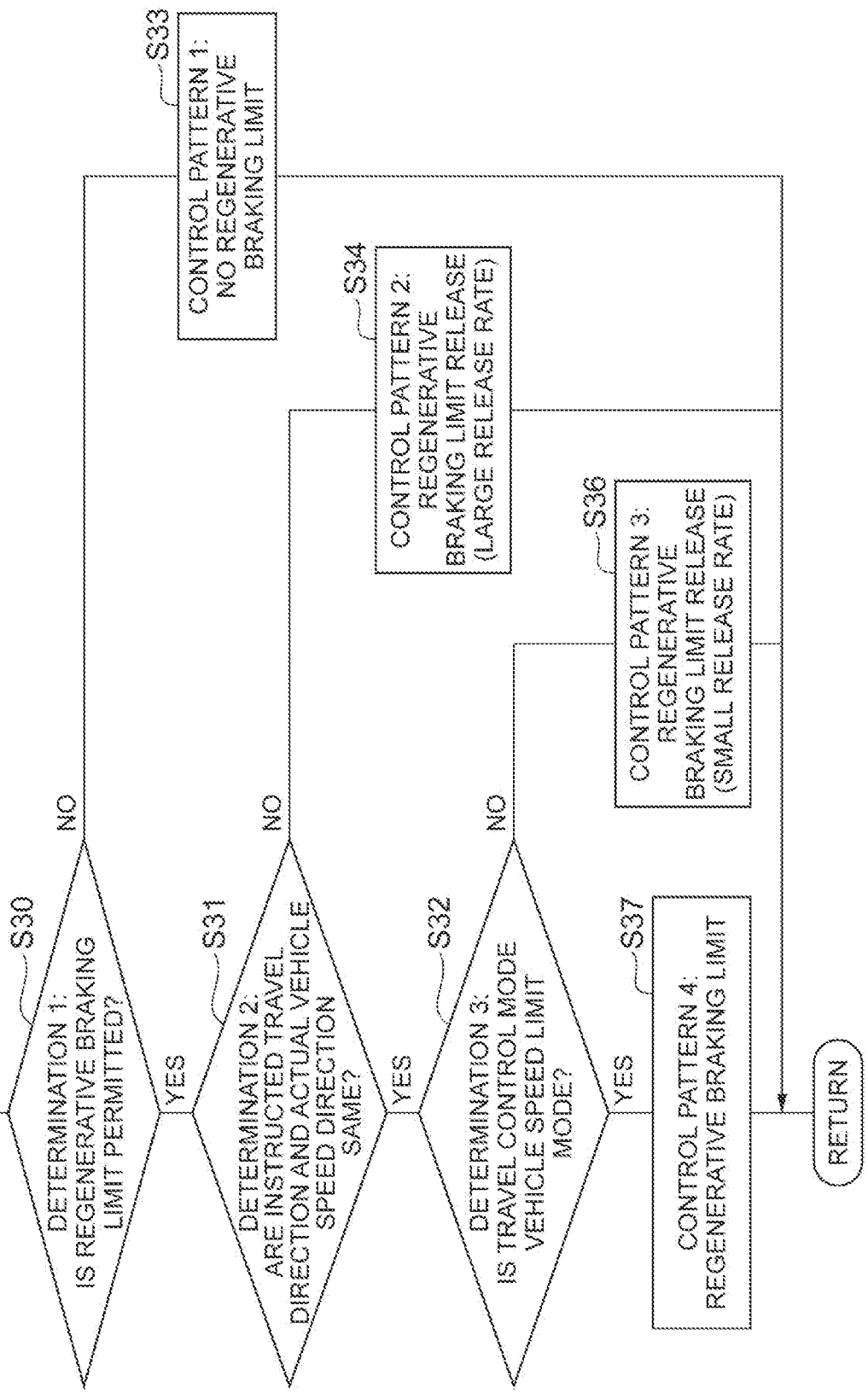
FIG. 5 is a flowchart illustrating one example of each control pattern.

Control content illustrated in FIG. 5 will be described. FIG. 5 is a flowchart illustrating one example of what determination is made by the controller 11 to execute the control patterns 1 to 4. In the flowchart of FIG. 5, a loop starting from a state, which is a state where the travel control mode is set to the vehicle speed limit mode M2 and the regenerative braking limit is permitted and in which the regenerative braking limit state is set, and returning to "start" immediately after reaching "return" is repeated. As illustrated in FIG. 5, the controller 11 determines whether or not the regenerative braking limit is permitted (determination 1: Step S30). In Step S30, it is determined whether the regenerative braking limit is set to permission or prohibition in the switching unit 20. When the determination result in Step S30 is NO (regenerative braking limit is prohibited), the controller 11 executes the control pattern 1 (Step S33).

The control pattern 1 is a pattern where when the condition that the regenerative braking limit is switched from permission to prohibition (when the determination 1 in Step S30 is NO) is satisfied as a predetermined condition, switching from the regenerative braking limit state to the regenerative braking limit release state is performed. As illustrated in FIG. 6, the controller 11 rapidly raises the regeneration limit value illustrated in the item "motor motoring and regeneration state" from the "regenerative braking limit value" to the "regenerative braking limit release value" at a timing at which the graph illustrated in the item "regenerative braking limit permission" is switched from "permission" to "prohibition". Incidentally, the actual regeneration value indicating a regeneration value that is actually generated is illustrated by a dotted line in the item "motor motoring and regeneration state" in FIG. 6. The rise of the actual regeneration value is shifted within the range of the regeneration limit value (within a range where the regeneration limit value is not exceeded) depending on the travel control mode, the direction, the target speed, the actual speed, and the like. Incidentally, in FIG. 6, items described as "no matter" are items that are not related to the control pattern 1, and thus may be in any state. Namely, in a case other than an operation such as executing the control patterns 2 and 3 ahead of the control pattern 1 to be described later, the accelerator pedal 12 or the direction lever 14 may be appropriately operated and the travel control mode may be appropriately switched. The same applies also to FIGS. 7 to 10 below. When the process of the control pattern 1 illustrated in Step S33 ends, the control illustrated in FIG. 5 ends. Next, when the travel control mode is set to the vehicle speed limit mode M2, the regenerative braking limit is permitted, and the regenerative braking limit state is set, the process is repeated from Step S30 again.

When the determination in Step S30 is YES, the controller 11 determines whether or not the instructed travel direction and the actual vehicle speed direction are the same direction (determination 2: Step S31). When the instructed travel direction is changed by the operation of the direction lever 14 or the actual speed is zero, the controller 11 determines that the instructed travel direction and the actual vehicle speed direction are not the same direction. As described above, when the determination result in Step S31 is NO, the controller 11 executes the control pattern 2 (Step S34).

The control pattern 2 is a pattern where when at least one of "the regenerative braking limit state is activated and the instructed travel direction is changed" and "the regenerative braking limit state is activated and the actual speed is zero" is satisfied as a predetermined condition, the change rate of the regeneration limit value is set to a value larger than a predetermined value and switching from the regenerative braking limit state to the regenerative braking limit release state is performed. The state where the change rate of the regeneration limit value is set to a rate larger than the predetermined value is a state where the change rate of the regeneration limit value is larger than a change rate in the control pattern 3 (FIGS. 9 and 10) to be described later. In this state, the regeneration limit value rises from the limit value to a maximum regenerative braking performance value, for example, in 0.2 seconds. Incidentally, such a large rate may be referred to as a "large release rate". When the process of the control pattern 2 illustrated in Step S34 ends, the control illustrated in FIG. 5 ends. Next, when the travel control mode is set to the vehicle speed limit mode M2, the regenerative braking limit is permitted, and the regenerative braking limit state is set, the process is repeated from Step S30 again.

FIG. 7 illustrates the content of the control pattern 2 when the condition that "the regenerative braking limit state is activated and the instructed travel direction is changed" is satisfied. For example, when the forklift 10 moves forward to descend a slope (refer to FIG. 11A), in a case where the instructed travel direction of the direction lever 14 is switched from "forward" to "reverse (may be neutral)", the condition that "the instructed travel direction is changed" is satisfied. At this time, the controller 11 raises the regeneration limit value illustrated in the item "motor motoring and regeneration state" from the "regenerative braking limit value" to the "regenerative braking limit release value" at a large release rate. In this case, as illustrated in the item "actual speed", the actual speed has a predetermined magnitude in a forward movement direction, but is decelerated since the regenerative braking force and the vehicle speed-limiting ability are improved due to the rise of the regeneration limit value.

FIG. 8 illustrates the content of the control pattern 2 when the condition that "the regenerative braking limit state is activated and the actual speed is zero" is satisfied. For example, when the forklift 10 stops as a result of a transition from a state where the forklift 10 moves forward to descend the slope to the state of reaching a flat road (refer to FIG. 11B), the speed is reduced as indicated by "A1" in the graph of "actual speed" and the actual speed is zero as indicated by "A2". At this time, the condition that "the actual speed is zero" is satisfied. At this time, the controller 11 raises the regeneration limit value illustrated in the item "motor motoring and regeneration state" from the "regenerative braking limit value" to the "regenerative braking limit release value" at a large release rate.

When the determination in Step S31 is YES, the controller 11 determines whether or not the travel control mode is the vehicle speed limit mode (determination 3: Step S32). When the actual travel direction of the vehicle coincides with the instructed travel direction of the vehicle and the target speed is higher than the actual speed (NO in Step S22 of FIG. 4) or the operation state of the accelerator pedal 12 in which the target speed is lower than the actual speed makes a transition to a non-operation state (Yes in Step S25 of FIG. 4), to thereby make a transition to the normal travel mode M1, the controller 11 determines that the travel control mode is not the vehicle speed limit mode M2. As described above, when the determination result in Step S32 is NO, the controller 11 executes the control pattern 3 (Step S36).

The control pattern 3 is a pattern where when at least one of "the regenerative braking limit state is activated, the actual travel direction of the vehicle coincides with the instructed travel direction of the vehicle, and the target speed is higher than the actual speed, to thereby make a transition from the vehicle speed limit mode to the normal travel mode" and "the regenerative braking limit state is activated and the operation state of the accelerator operation member in which the target speed is lower than the actual speed makes a transition to a non-operation state, to thereby make a transition from the vehicle speed limit mode to the normal travel mode" is satisfied as a predetermined condition, the change rate of the regeneration limit value is set to a value smaller than a predetermined value and switching from the regenerative braking limit state to the regenerative braking limit release state is performed. The state where the change rate of the regeneration limit value is set to a value smaller than the predetermined value is a state where the change rate of the regeneration limit value is smaller than the above-described change rate in the control pattern 2 (FIGS. 7 and 8). In this state, the regeneration limit value rises from the limit value to a maximum regenerative braking performance value, for example, in 1 second. Incidentally, such a small rate may be referred to as a "small release rate". The relationship between the change rate when the release rate is large and the change rate when the release rate is small is not particularly limited, and when the release rate is small, the regeneration limit value may return to the maximum regenerative braking performance value in a time which is predetermined times the time taken when the release rate is large. When the process of the control pattern 3 illustrated in Step S36 ends, the control illustrated in FIG. 5 ends. Next, when the travel control mode is set to the vehicle speed limit mode M2, the regenerative braking limit is permitted, and the regenerative braking limit state is set, the process is repeated from Step S30 again.

FIG. 9 illustrates the content of the control pattern 3 when the condition that "the regenerative braking limit state is activated, the actual travel direction of the vehicle coincides with the instructed travel direction of the vehicle, and the target speed is higher than the actual speed, to thereby make a transition from the vehicle speed limit mode to the normal travel mode" is satisfied. For example, when the forklift 10 moves forward to descend the slope in a state where the operation amount of the accelerator pedal 12 is small (no operation may be performed) (refer to FIG. 11A), in a case where the operation amount of the accelerator pedal 12 is increased to cause the target speed to be higher than the actual speed, the travel control mode makes a transition from the vehicle speed limit mode M2 to the normal travel mode M1. At this time, the condition that "the actual travel direction of the vehicle coincides with the instructed travel direction of the vehicle and the target speed is higher than the actual speed, to thereby make a transition from the vehicle speed limit mode to the normal travel mode" is satisfied. At this time, the controller 11 raises the regeneration limit value illustrated in the item "motor motoring and regeneration state" from the "regenerative braking limit value" to the "regenerative braking limit release value" at a small release rate.

FIG. 10 illustrates the content of the control pattern 3 when the condition that "the regenerative braking limit state is activated and the operation state of the accelerator operation member in which the target speed is lower than the actual speed makes a transition to a non-operation state, to thereby make a transition from the vehicle speed limit mode to the normal travel mode" is satisfied. For example, when the forklift 10 moves forward to descend the slope in a state where the operation amount of the accelerator pedal 12 is small (refer to FIG. 11A), in a case where the accelerator pedal 12 is not operated, the travel control mode makes a transition from the vehicle speed limit mode M2 to the normal travel mode M1. At this time, the condition that "the operation state of the accelerator operation member in which the target speed is lower than the actual speed makes a transition to a non-operation state, to thereby make a transition from the vehicle speed limit mode to the normal travel mode" is satisfied. At this time, the controller 11 raises the regeneration limit value illustrated in the item "motor motoring and regeneration state" from the "regenerative braking limit value" to the "regenerative braking limit release value" at a small release rate.

When the determination in Step S32 is YES, the controller 11 executes the control pattern 4 (Step S37). The control pattern 4 is a pattern where when the condition that "the regenerative braking limit state is activated, the actual travel direction of the vehicle coincides with the instructed travel direction of the vehicle, and the vehicle speed limit mode is activated" is satisfied as a predetermined condition, the regeneration limit value is maintained at the "regenerative braking limit value". When the process of the control pattern 4 illustrated in Step S37 ends, the control illustrated in FIG. 5 ends. The, the state where the control pattern 4 is executed is a state where the travel control mode is set to the vehicle speed limit mode M2 and the regenerative braking limit is permitted and a state where the regenerative braking limit state is set, and thus the process is repeated from Step S30 again.

Next, effects of the forklift 10 that is an industrial vehicle according to the present embodiment will be described.

The forklift 10 includes the switching unit 20 that switches between permission and prohibition of the regenerative braking limit. In addition, when the vehicle speed limit mode M2 is activated and the regenerative braking limit is permitted, the controller 11 is configured to be switchable between the regenerative braking limit state where the regenerative braking limit is performed and the regenerative braking limit release state where the regenerative braking limit is released. With such a configuration, when the regenerative braking limit is permitted, the regenerative braking is limited in the vehicle speed limit mode M2; and thereby, it is possible to suppress the regenerative performance and as necessary, it is possible to release the regenerative braking limit. Meanwhile, the controller 11 has the control patterns 1 to 3 that switch between the regenerative braking limit state and the regenerative braking limit release state when the predetermined condition is satisfied. In this case, a proper condition is set based on an operation or the like performed by the driver; and thereby, the controller 11 is switchable between the regenerative braking limit state and the regenerative braking limit release state in a mode according to the intention of the driver. As described above, it is possible to improve the sensory performance of the operation of the forklift 10.

The control pattern 2 is a pattern where when at least one of "the regenerative braking limit state is activated and the instructed travel direction is changed" and "the regenerative braking limit state is activated and the actual speed is zero" is satisfied as a predetermined condition, the change rate of the regeneration limit value is set to a value larger than the predetermined value and switching from the regenerative braking limit state to the regenerative braking limit release state is performed. For example, when the instructed travel direction is changed during descending (when the direction lever 14 is operated to a reverse side that is an ascending direction, or is operated to be neutral), it is considered that the driver has an intention of stopping the descending movement. Therefore, the controller 11 executes the control pattern 2 to rapidly release the regenerative braking limit, to continue the vehicle speed limit mode M2, and to improve the regenerative braking performance, so that the forklift 10 can be decelerated in advance.

In addition, for example, when the forklift 10 reaches a flat road after descending, the forklift 10 stops while continuing the regenerative braking limit state. When the actual speed becomes zero after stopping, the regenerative braking force is not generated, and thus even though the controller 11 executes the control pattern 2 to rapidly release the regenerative braking limit, the movement is not affected. Accordingly, when the driver performs the next operation, the controller 11 can rapidly perform travel control according to the intention. Incidentally, as illustrated by the dotted line in FIG. 9, the actual regeneration value is gradually reduced since the forklift 10 reaches the flat road. As described above, even though the regenerative braking limit is rapidly released at a large release rate, a special movement is not affected. At this time, when the controller 11 releases the regenerative braking limit at a small release rate as in the control pattern 3, it takes too much time to complete the release, and when the next movement is performed, there is a possibility that the next movement is unnecessarily affected by the regenerative braking limit. Meanwhile, when releasing is performed such that the regeneration limit value rises rapidly as in the control pattern 1, in a case where an external force is applied to the forklift 10, a fluctuation in actual regeneration value becomes too large. As described above, the release rate is set to be large; and thereby, it is possible to reduce the impact thereof.

The control pattern 3 is a pattern where when at least one of "the regenerative braking limit state is activated, the actual travel direction of the vehicle coincides with the instructed travel direction of the vehicle, and the target speed is higher than the actual speed, to thereby make a transition from the vehicle speed limit mode to the normal travel mode" and "the regenerative braking limit state is activated and the operation state of the accelerator operation member in which the target speed is lower than the actual speed makes a transition to a non-operation state, to thereby make a transition from the vehicle speed limit mode to the normal travel mode" is satisfied as a predetermined condition, the change rate of the regeneration limit value is set to a value smaller than the predetermined value and switching from the regenerative braking limit state to the regenerative braking limit release state is performed. For example, when an accelerator is operated by a large amount during descending to increase the target speed, it is considered that the driver has the intention of accelerating in a descending direction (namely, actual travel direction). The controller 11 can cause the travel control mode to make a transition to the normal travel mode M1 according to the intention. At this time, the controller 11 executes the control pattern 3 to be able to gently release the regenerative braking limit and accelerate the forklift 10 in a state where the vibration due to the change the regenerative force, unintended deceleration (for example, refer to B of FIG. 9), or the like is suppressed.

In addition, for example, when the accelerator pedal 12 is set to a non-operation state during descending, it is considered that the driver has the intention of stopping. The controller 11 causes the travel control mode to make a transition to the normal travel mode M1 according to the intention to be able to stop the forklift 10. However, it is considered that in the above operation, there is less intention of decelerating than when the instructed travel direction is changed (for example, the case illustrated in FIG. 7). Therefore, the controller 11 executes the control pattern 3 to be able to gently release the regenerative braking limit and suppress the vibration due to the change of the regenerative force, unintended deceleration (for example, refer to C of FIG. 10), or the like.

The control pattern 1 is a pattern where when the condition that the regenerative braking limit is switched from permission to prohibition is satisfied as a predetermined condition, switching from the regenerative braking limit state to the regenerative braking limit release state is performed. In this case, when the regenerative braking limit is prohibited, the controller 11 executes the control pattern 1, so that the regenerative braking limit release state is rapidly enabled.

The present invention is not limited to the above embodiment.

For example, in the above embodiment, the controller 11 has all of the control patterns 1 to 3; however, the controller 11 may have at least one, and a control pattern that is not adopted may be present. In addition, the order of the determinations 1 to 3 for the control patterns 1 to 3 is not particularly limited, and may be appropriately changed without departing from the concept.

In addition, the conditions of transition between the normal travel mode M1 and the vehicle speed limit mode M2 are not particularly limited. For example, when the accelerator makes a transition from operation to non-operation during traveling, a transition may be made from the normal travel mode M1 to the vehicle speed limit mode M2. Then, in this case, the vehicle speed limit value in the vehicle speed limit mode M2 may be set to the actual speed during transition of the accelerator to non-operation. According to this configuration, the actual speed (vehicle speed limit value) in the vehicle speed limit mode M2 after transition is the actual speed in the normal travel mode M1 immediately before transition to the vehicle speed limit mode M2, and traveling at a speed exceeding the actual speed (vehicle speed limit value) is limited. Therefore, even though the vehicle speed limit value in the vehicle speed limit mode M2 is not set in advance, it is possible to control the traveling of the vehicle in the vehicle speed limit mode M2. In addition, as described above, when a transition is made from the normal travel mode M1 to the vehicle speed limit mode M2, the control patterns according to the present invention may be adopted in the movement where the vehicle descends without stopping while maintaining the actual speed. In this case, when in the normal travel mode M1, the direction lever 14 is in a position other than neutral and the accelerator is operated, the normal travel mode M1 is continued. Therefore, the regenerative braking limit according to the present invention is not performed, and when the vehicle is decelerated by other vehicle speed control (for example, vehicle stabilization control where the vehicle speed is changed according to the turning radius), the vehicle can be decelerated with the maximum regenerative performance. Therefore, the other speed control is not affected by the control of the present invention, so that the driver greatly feels the reproducibility of a movement for an operation and the sensory performance is improved. Then, when a transition to the vehicle speed limit mode M2 is made by letting off the accelerator, the regenerative performance is suppressed only by letting off the accelerator. Therefore, the driver actively uses the brake for deceleration, and thus the reproducibility of a movement when the accelerator is let off can be also greatly felt and the discomfort can be reduced.

The switching unit 20 is not limited to a program, and may be configured to be switchable by the driver's operation of a switch, an operation panel, or the like connected to the controller 11. In this case, the switching unit 20 may be configured as in two examples described below. First, in a situation where an operation (here, braking performance) is prioritized over the sensory function, the regenerative braking limit may be switched to prohibition by software to perform braking. Second, a method of use, such as in a situation where there is no restriction on the regeneration amount of a power supply (situation where a condition such as power supply temperature or power supply voltage is not required to limit the performance in a normal usage range), the regenerative braking limit is prohibited and thus the regenerative braking limit is released in a normal situation to use a maximum regenerative braking force and the regenerative braking limit is permitted in a restriction situation to start limiting the performance, may be employed.

What is claimed is:

1. An industrial vehicle that has a normal travel mode where the vehicle is controlled to travel at a vehicle speed corresponding to a target speed and a vehicle speed limit mode where a vehicle speed limit value smaller than a maximum vehicle speed value is determined and the vehicle is controlled to travel at a vehicle speed smaller than the vehicle speed limit value, as travel control modes, the vehicle comprising:
    an accelerator operation member that instructs the vehicle to accelerate according to an operation performed by a driver;
    a target speed calculation unit that calculates the target speed of the vehicle based on an operation amount of the accelerator operation member;
    a direction instruction member that instructs the vehicle on a travel direction according to an operation performed by the driver;
    a direction calculation unit that calculates an instructed travel direction of the vehicle based on an operation position of the direction instruction member;
    a vehicle speed calculation unit that calculates an actual speed of the vehicle;
    a switching unit that switches between permission and prohibition of regenerative braking limit and
    a control unit that controls traveling of the vehicle,
    wherein the control unit is configured to be switchable between (i) a regenerative braking limit state where the regenerative braking limit is performed when the vehicle speed limit mode is activated and the regenerative braking limit is permitted, and (ii) a regenerative braking limit release state where the regenerative braking limit is released,
    wherein the control unit has at least one control pattern that switches between the regenerative braking limit state and the regenerative braking limit release state when a predetermined condition is satisfied, and
    wherein the control pattern is a pattern where, when at least one of: (a) a condition that the regenerative braking limit state is activated and the instructed travel direction is changed or (b) a condition that the regenerative braking limit state is activated and the actual speed is zero, is satisfied as the predetermined condition, a change rate of a regeneration limit value is set to a value larger than a predetermined value and switching from the regenerative braking limit state to the regenerative braking limit release state is performed.

2. The industrial vehicle according to claim 1,
    wherein the control pattern is a pattern where when a condition that the regenerative braking limit is switched from permission to prohibition is satisfied as the predetermined condition, switching from the regenerative braking limit state to the regenerative braking limit release state is performed.

3. An industrial vehicle that has a normal travel mode where the vehicle is controlled to travel at a vehicle speed corresponding to a target speed and a vehicle speed limit mode where a vehicle speed limit value smaller than a maximum vehicle speed value is determined and the vehicle is controlled to travel at a vehicle speed smaller than the vehicle speed limit value, as travel control modes, the vehicle comprising:
    an accelerator operation member that instructs the vehicle to accelerate according to an operation performed by a driver;
    a target speed calculation unit that calculates the target speed of the vehicle based on an operation amount of the accelerator operation member;
    a direction instruction member that instructs the vehicle on a travel direction according to an operation performed by the driver;
    a direction calculation unit that calculates an instructed travel direction of the vehicle based on an operation position of the direction instruction member;
    a vehicle speed calculation unit that calculates an actual speed of the vehicle;
    a switching unit that switches between permission and prohibition of regenerative braking limit and
    a control unit that controls traveling of the vehicle,
    wherein the control unit is configured to be switchable between (i) a regenerative braking limit state where the regenerative braking limit is performed when the vehicle speed limit mode is activated and the regenerative braking limit is permitted, and (ii) a regenerative braking limit release state where the regenerative braking limit is released,
    wherein the control unit has at least one control pattern that switches between the regenerative braking limit state and the regenerative braking limit release state when a predetermined condition is satisfied, and
    wherein in the vehicle speed limit mode, the vehicle receives gravity on a slope to be able to travel even though the driver does not operate the accelerator operation member, and
    wherein when the vehicle moves forward to descend the slope, the control pattern is a pattern where, when at least one of: (a) a condition that the regenerative braking limit state is activated, an actual travel direction of the vehicle coincides with the instructed travel direction of the vehicle, and the target speed is higher than the actual speed, to thereby make a transition from the vehicle speed limit mode to the normal travel mode or (b) a condition that the regenerative braking limit state is activated and an operation state of the accelerator operation member in which the target speed is lower than the actual speed makes a transition to a non-operation state, to thereby make a transition from the vehicle speed limit mode to the normal travel mode, is satisfied as the predetermined condition, a change rate of a regeneration limit value is set to a value smaller than a predetermined value and switching from the regenerative braking limit state to the regenerative braking limit release state is performed.

4. The industrial vehicle according to claim 3,
    wherein the control pattern is a pattern where when a condition that the regenerative braking limit is switched from permission to prohibition is satisfied as the predetermined condition, switching from the regenerative braking limit state to the regenerative braking limit release state is performed.

* * * * *